United States Patent [19]

Stewart et al.

[11] 4,201,952
[45] May 6, 1980

[54] GAS LASER AERODYNAMIC WINDOW

[76] Inventors: Charles C. Stewart, 144 Nashoba Rd., Concord, Mass. 01742; Joel M. Avidor, 17 Gordon St., Rehovot, Israel; Evan R. Pugh, 61 Bertwell Rd., Lexington, Mass. 02173; John W. Lothrop, 154B, Peabody, Mass. 01960

[21] Appl. No.: 895,416

[22] Filed: Apr. 11, 1978

[51] Int. Cl.² ............................................. H01S 3/02
[52] U.S. Cl. ........................ 331/94.5 D; 331/94.5 G; 350/319
[58] Field of Search .................... 331/94.5 G, 94.5 P, 331/94.5 D; 350/319

[56] References Cited
U.S. PATENT DOCUMENTS 4,112,388   9/1978   McLafferty ................... 331/94.5 G Primary Examiner—William L. Sikes
Attorney, Agent, or Firm—Richard S. Sciascia; Paul N. Critchlow

[57] ABSTRACT

The aerodynamic window is formed of a contiguous pair of gas jet streams driven at subsonic velocity across the entire cross-sectional area of an annular laser beam. One of the jet streams has a shear interface with the interior gas of the laser and has its index of refraction matched to it. The other interfaces with the outside air into which the beam passes and it too has a refraction index matched to the air. Matching of the indices minimizes optical distortion of the beam at the shear interfaces. Distortion produced at the boundary layer of the contiguous jet streams is minimized by equalizing their velocities. To maintain a desired laser cavity pressure, the jet streams are permitted to bend responsively to the pressure differential. The degree of the bending is controlled to reduce window gas consumption.

5 Claims, 5 Drawing Figures

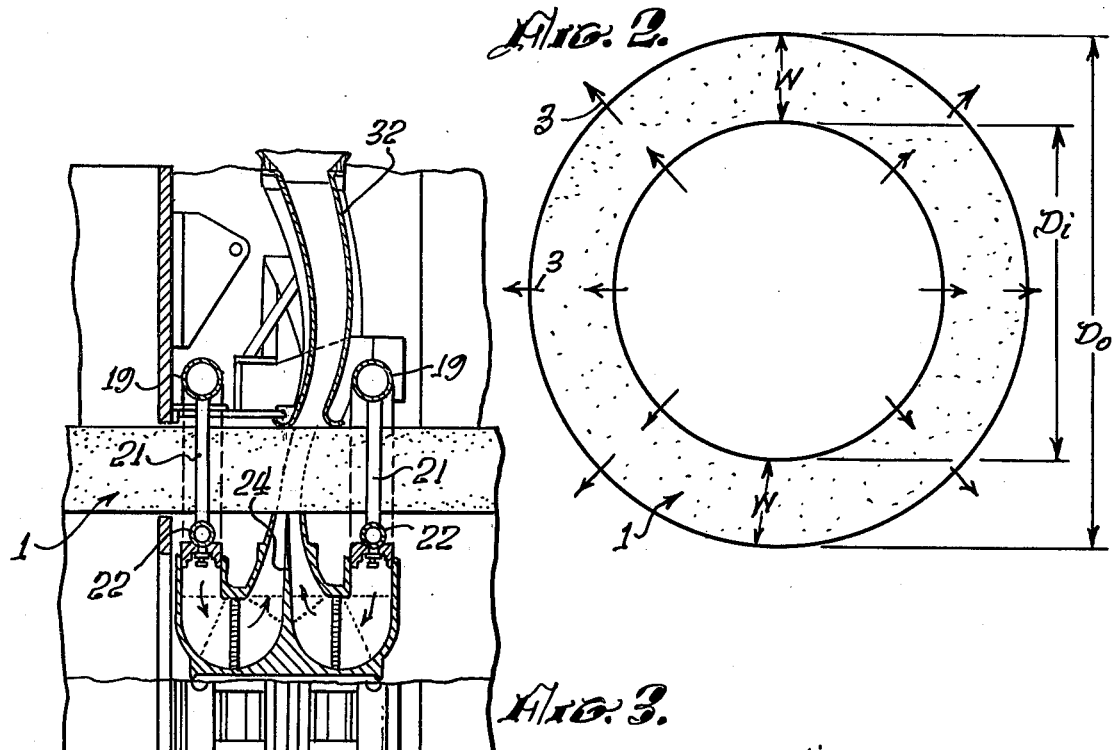
FIG. 2.
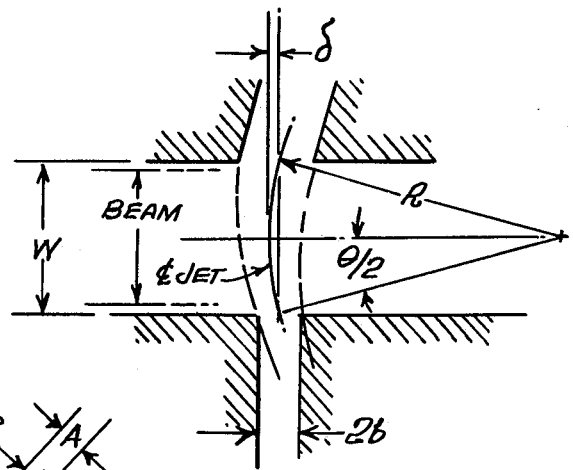
FIG. 3.
FIG. 4.
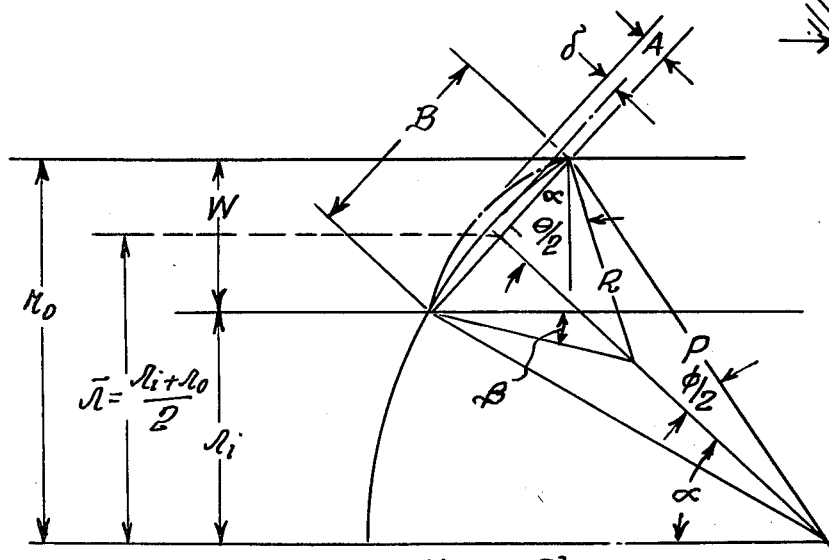
FIG. 5.

GAS LASER AERODYNAMIC WINDOW

BACKGROUND OF THE INVENTION

The invention relates to gas lasers and, in particular, to aerodynamic windows for optically transmitting high energy laser beam into the surrounding environment.

Aerodynamic windows are rather well known and have been discussed in a number of publications including, for example, U.S. Pat. Nos. 3,617,928, 3,907,409, 3,918,800, 3,973,321 and others. Generally considered, these windows are formed by a window gas driven at a high, jet-stream velocity across the laser beam and, of course, the jet streams serve the same functions as the more conventional solid windows. In other words, they contain the gas in the laser, maintain a desired laser cavity pressure and they optically transmit the laser beam into the outside environment.

As compared with the solid-type windows, aerodynamic windows are particularly suited for transmitting high energy, relatively large-diameter laser beams. Solid windows, as is known, absorb a great deal of beam energy and become difficult if not impossible to cool. Gas windows avoid this particular difficulty.

Several problems, however, do arise. For example, the use of jet streams, whether driven at subsonic or supersonic velocities, tend to produce optical distortions. For one reason, the gas which forms the window usually differs as a media from the interior gas of the laser and from the gas or air in the outside environment. The differing indices of refraction produce distortions in the beam path. Also, since the high-velocity, jet streams of the windows have a shear interface with the interior gas of the laser on one side and another such interface with the air on the outside further distortions result. Obviously, any such distortions reduce the optical quality of the window and, in particular, result in a significant loss of the far field intensity of the laser beam. To minimize this loss, the index of refraction gradients in the various media disposed in the beam path should be aligned as nearly as possible parallel to the propagation direction of the laser beam. Achievement of this parallel relationship, however, is not easily achieved especially when the window jets are driven at very high, supersonic velocities. In some laser applications high supersonic velocities are needed to maintain large interior and exterior pressure differentials. Lower subsonic velocities may be more desirable but, to some extent, their use is limited to applications having small pressure differentials. The window of the present invention is adapted primarily for small pressure differential lasers. More specifically, the present window preferably contemplates pressure differences on the order of 10 cm $H_2O$.

Another problem with aerodynamic windows is one of minimizing the consumption of the gas that forms the window. As will be understood, this window gas usually is directed by a nozzle radially across the laser beam where it is received by a diffuser conduit and conducted to an exhaust manifold. Window gas consumption consequently can be high enough to constitute a significant economic factor especially when the laser beam is large in diameter, i.e. on the order of 1 m or more. In particular, consumption will vary with the square of the span of the beam. Again, the present window contemplates use with large diameter, parallel (unfocused) laser beams so that the degree of window gas consumption is a signficant factor. The prior art has recognized these particular problems but, as far as presently is known, has not provided adequate solutions especially when the application involves the transmission with good optical quality of a high energy, large diameter laser beam.

It is therefore a primary object of the present invention to significantly improve the optical transmission quality of aerodynamic windows.

A further object is to provide a window capable of minimizing window gas consumption.

As indicated, the present invention primarily is concerned with high energy, large diameter laser beams and with lasers of the type having relatively small pressure differences between their interior cavity and the outside environment. In this latter regard, a further object is to maintain this pressure differential in a manner which itself is advantageous in minimizing window gas consumption.

These and other objects are achieved by utilizing an aerodynamic window formed of a pair of window-forming jets one of which has a shear interface with the interior gas of the laser while the other has a similar interface with the outside air. To minimize optical distortion, the jet stream interfaced with the laser gas has its index of refraction matched to that of the interior laser gas. The other jet similarly is matched with the refraction index of air. Also, the jets are driven at equalized velocities to minimize distortion at their mutual or boundary interface. A further refinement used to maintain the interior pressure of the laser cavity is to permit the contiguous pair of jet streams to bend a controlled amount responsively to the pressure differential. The degree of the bend, as well as the jet velocity, is controlled to achieve a minimum window gas consumption. Another preferred feature directed also at window gas consumption is provided by geometrically disposing the jet forming nozzles in the center of an annular laser beam so that the jet stream flows radially outwardly across the 360 degrees of the annular beam. This geometry reduces the beam span required for window effectiveness and correspondingly reduces window gas consumption.

BRIEF DESCRIPTION OF THE DRAWINGS

The invention is illustrated in the accompanying drawings of which:

FIG. 2 is a cross-sectional view showing the form of the annular laser beam for which the present window is specially adapted;

FIG. 3 is a view somewhat similar to FIG. 1 showing the present window forming apparatus in greater structural detail; and FIGS. 4 and 5 are schematics of the beam-crossing window jet illustrating geometries applicable to the control of the jet radius of curvature.

DETAILED DESCRIPTION OF THE DRAWINGS

Figure 1:
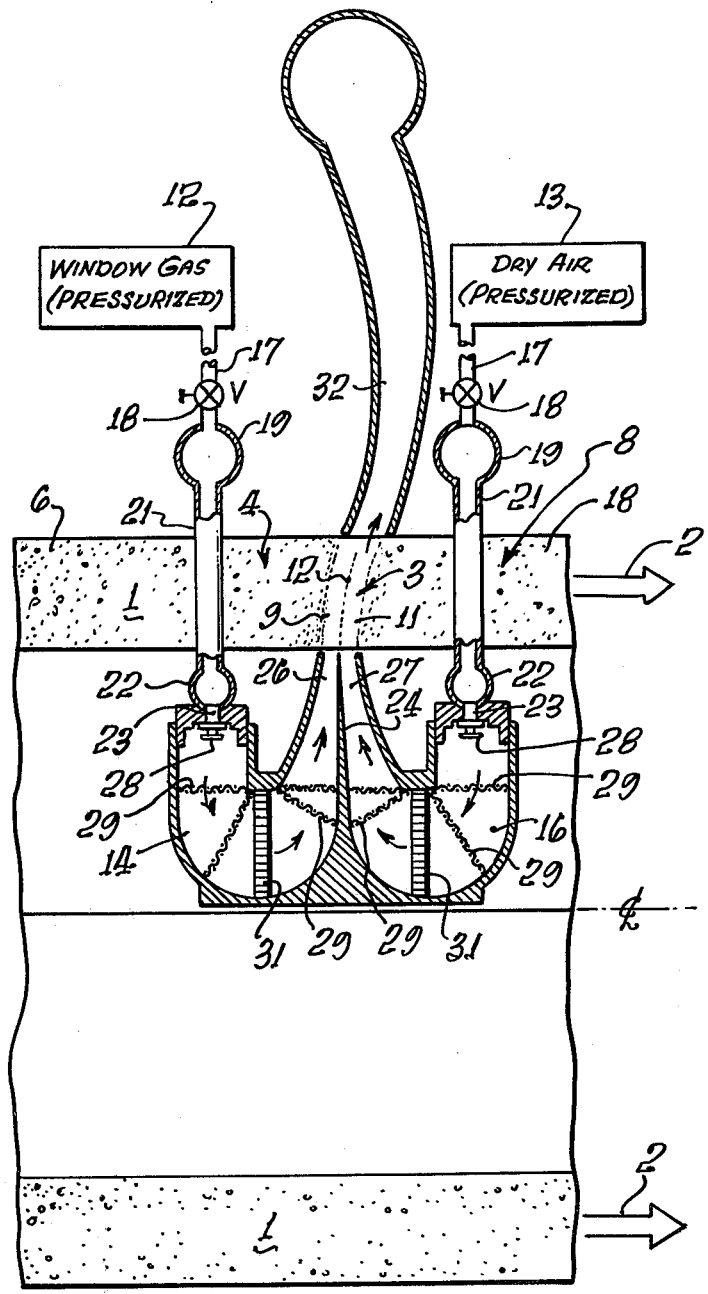
FIG. 1 is a somewhat schematic illustration showing the jet stream crossing the laser beam to form the present aerodynamic window.

Referring to FIG. 1, numeral 1 designates an annular, doughnut-shaped laser beam generated within a laser and propagated in the direction indicated by arrows 2. An aerodynamic window formed by a gas jet stream 3 crosses the entire cross-sectional area of the annular beam and, in a manner similar to any solid window, provides an enclosure for an interior laser cavity 4. The jet stream window can be viewed as a fan jet directed radially across the beam throughout its 360 degrees.

The laser of the present invention is a gas laser containing in its interior cavity 4 a lasing gas 6 which, for present purposes, can be any gas or gas mixture. As such, it will have a known index of refraction. The laser beam generated by the lasing media is transmitted through aerodynamic window 3 into the external environment which usually is air. For identification, the air is shown as an external gas medium 8. As will be described, the present window seeks primarily to pass or transmit the beam with an optimum optical efficiency achieved by minimizing the tendency of the beam to optically distort due to differing refraction indices between the media forming the interior lasing gas 6, the gas jet window 3 and the outside air 8. Also, the window must maintain any designed pressure differential between the laser interior and the outside air. In this regard, although the characteristics of the present window can be adapted for large pressure differentials, the preferred application comtemplates a relatively small one such, for example, as a differential of about 10 cm/$H_2O$ with laser cavity 4 being at the higher pressure. Further, to facilitate understanding, it can be considered that the gas laser beam generated by the laser is a high energy beam of large diameter (1 m or more) projected in the annular form shown in FIG. 2. The arrows of FIG. 2 simply indicate the flow of the fan jet of the window. The annular shape, for a number of reasons, is a preferred geometry for high energy lasers. Also, the annulus of such beams frequently is divided into individual circumferential sectors which, among other things, facilitate laser gas inflow and outflow. Although such a sectored annulus presently is contemplated, its use is not a factor in the present window operation and, consequently, it is not illustrated in the drawings.

A principle feature of the present invention is the fact that aerodynamic window 3 is formed of a pair of contiguous gas jet streams 9 and 11 having, as shown in FIG. 1, a core portion formed by a boundary interface 12. Stream 9 is formed of a window gas which is an optically-non-absorbing gas with an index of refraction closely matched to the index of refraction of laser gas 6. Stream 11 is formed of air or of a gas with an index of refraction closely matched to the index of refraction of air 8. In one experimental set-up, stream 9 was formed of a mixture of Ar, He, $N_2$ (5:3:1) while stream 11 was $N_2$. The stream media, of course, can vary with the composition of the lasing gas provided, as stated, the indices of refraction match one another. A close match is desirable for optimum optical window characteristics. However, improved optical performance otherwise can be achieved with the degree of the improvement being somewhat dependant upon the closeness of the matching.

Structurally considered, the twin streams are derived from suitable sources such as a so-called 'window gas' source 12 for stream 9 and a 'dry air' source 13 for stream 11. These sources, which are pressurized, supply their gases separately to a pair of plenum chambers 14 and 16 through identical piping systems. Specifically, the supply gases are conducted through pipes 17, valves 18, outer manifolds 19 and pipes 21 into inner manifolds 22 which have nozzles 23 metering the gas through sonic orifices into plenum chambers 14 and 16. As shown, these chambers are, in effect, a single plenum divided into two parts by a so-called splitter plate 24 which, along with the plenum walls form a pair of jet stream orifices or nozzles 26 and 27 to provide aerodynamic window jet streams 9 and 11. Within plenums 14 and 16, the high velocity jets issuing from their admission nozzles 23 are broken-up and smoothed by splash plate 28, screens 29 and honeycombs 31. The actual velocity of the jets can be controlled by valves 18 or by other suitable means and, for purposes to be discussed, the pressures in the two supply systems are equalized so as to equalize the velocity of the pair of window streams 9 and 11.

As shown in FIG. 1, the streams issuing from jet nozzles 26 and 27 are directed radially outwardly across beam 1 and, on the outer side of the beam, are received by conventional diffuser members 32. As also will be noted, the stream path across the beam curves a certain amount from its initial radial direction. The curvature results from an excess of pressure ($\Delta P$) or, in other words, it is produced by the pressure differential between the laser's interior and exterior. There is a change in radial momentum of the jet which, depending upon the jet velocity, produces a certain pressure-maintaining curvature. Thus, the $\Delta P$ of the laser forms the fan jet of the window into a sector of a toroidal shaped surface. As will be shown, the degree of the curvature and the velocity of the jet streams are factors which can significantly affect window gas consumption and, therefore factors to be controlled.

Window gas consumption also is reduced by the geometry of the annular fan jet which forms the desired window. Thus, as should be apparent, jet streams of the present window geometrically are initiated from the center of the annulus and they are directed radially outwardly across the entire 360° circumference of the annular laser beam. Since the window jet fans out in all directions, it can be classed as an annular fan jet of toroidal shape. Window gas consumption is significantly minimized since, as will be appreciated, gas consumption is a factor that varies with the square of the beam span. Thus, referring to FIG. 2, the span of the beam, W, is a minimum and gas consumption consequently is reduced to a minimum. In contrast, two-dimensional jets, or in other words, jets in which the flow is diametrically across the annulus require excessive window gas since the beam or jet span, W, then is the full diameter of the annulus.

FIG. 3 simply illustrates a specific structural arrangement used to establish the annular fan jet from a central position of the beam annulus. The arrangement, however, is quite similar to that schematically shown in FIG. 1. Thus, as shown, the gases for each of the twin window jets are supplied by conduits 33 and 34 to toroidal outer manifolds 18 situated at the outer circumference of laser beam 1. Gas then is fed through eight spoke conduits 21 into inner manifolds 22 which, in turn, supply plenum chambers 14 and 16. As described with reference to FIG. 1, the FIG. 3 arrangement also employs a splitter plate 24 to form the twin jets and it utilizes similar splash plates, screens and honeycombs to reduce turbulence.

A principal feature of the present window is, as already stated, its use of the pair of jet streams 9 and 11 to form the desired window. The primary reason for the use of the two, contiguous streams is to provide an arrangement in which the indices of refraction at their stream interfaces can be matched. In this regard, jet stream 9 will be seen to have a shear interface 36 with interior laser gas 6 and jet stream 11 another shear interface 37 with the outside air. It has been demonstrated that, when the indices of refraction of the gas media at their shear interfaces are matched as nearly as possible, the optical quality or efficiency of the window is greatly improved. In other words, the match reduces the refractive distortion or bending of the path of the beam at the interface regions. The matching tends to align the index of refraction gradients in the interfaced media disposed in the path of the beam and the alignment produces a situation in which the gradients are as nearly parallel as possible to laser beam propagation direction. As a result, there is a minimum loss in far field intensity of the beam and the beam is transmitted with optimum optical efficiency.

Aside from shear interfaces 36 and 37, there also is the previously-identified boundary interface 12 which may introduce turbulence and optical distortions. To minimize distortions, the velocity of two jet streams 9 and 11 is equalized by controlling gas supply pressures. In tests which have been conducted, the optical quality of the two-part window jet has been shown to be significantly improved by the use of both the refraction matching of the media and the equalizing of the velocities of the two jet streams forming the window.

It already has been noted that window gas consumption can be minimized by controlling the jet velocity of the window streams and, also, by controlling the radius of curvature of the twin jet streams crossing the beam. In particular, it can be shown that by minimizing (under certain constraints) the radius of curvature and, also, by maximizing the jet velocity, consumption can be minimized. There is, however, one clear restraint on the maximizing of the velocity. The restraint involves the need to maintain the beam core or, in other words, the shear-free boundary interface 12 across the entire span of the beam. If the jet velocity is too high, the turbulent mixing zones will intercept the interface before it crosses the beam. Shear then is introduced and optical quality degraded.

With regard to the velocity, it will be recognized that some variation may be needed during laser operation to compensate for variations in laser cavity pressures. Clearly a particular jet momentum flow is needed to insure a controlled entry of the jet into the diffuser if cavity pressure varies. Variable geometry nozzles can be used for this purpose, but, as presently operated, it is preferred to use a fixed geometry nozzle and to hold the jet radius of curvature constant by adjusting the momentum flow. The previously-mentioned constraint on the jet velocity maximum (maintainence of the core) still applies. As an example, an aerowindow operating in a range up to 4 inches of water above ambient can use a flow velocity of approximately 100 m/sec. At this subsonic velocity, rather small density variation effects across the mixing layer will take effect.

FIGS. 4 and 5 are included to demonstrate the fact that consumption of jet flow gas is dependant both upon the radius of the jet curvature and the jet velocity. FIG. 4 relates to a rectilinear laser geometry or, in other words, a geometry in which the beam annulus is rectilinear. FIG. 5 is the spherical geometry applicable to what is presently known as the Thumper laser in which the laser geometry is annular.

Referring to these Figures, the following elaborates on the radius of curvature factor. First, for the free jet crossing the beam as shown in FIG. 4, continuity may be written in streamline coordinates as $$m_o = 2\rho V_o bh \tag{1}$$

Conservation of momentum may be written $$mV = HR\Delta p, \text{ normal to streamlines} \tag{2}$$

$$mV = m_o V_o, \text{ in streamline direction} \tag{2a}$$

where
 b = axial half width of jet nozzle;
 h = mean circumference of jet;
 m = mass flow rate of gas;
 $\Delta p$ = pressure difference across window;
 R = radius of curvature of the jet caused by $\Delta P$;
 V = jet velocity;
 $\rho$ = gas density;
subscript o denotes consitions leaving the jet nozzle.

Equation (2) shows that to conserve window gas, the jet radius of curvature, R, should be minimized and the jet velocity maximized if other variables are held constant. However, there are constraints. The minimum radius of curvature of a two dimensional window jet is given by $$R_{min} = W^2/8\delta + \delta/2 \tag{3}$$

where
 W = span of jet;
 $\delta$ = distance between the circular arc described by the jet, and a chord of that arc subtended by W (See FIG. 4).

To limit peak-to-peak phase mismatch of the beam due to distortion of the interface from a plane, the distance $\delta$ has been limited to 1 cm-atm.

For the Thumper laser geometry a modification of the above theory permits a smaller radius of curvature, R, to be achieved. FIG. 5 shows that for the Thumper geometry, the distance $\delta$ can be measured between the toroidal gas/air interface and a sphere whose center lies on the centerline of the laser device. $\delta$ then is the measure of distortion of the air/gas interface relative to an ideal spherical interface. A spherical interface has only a first order beam focusing effect, which can be compensated for by the optical system.

For this toroid/sphere geometry, the minimum jet radius is $$R'_{min} = B^2/8A + A/2 \tag{4}$$

where $A = \delta + \rho(1 - \cos \phi/2)$, distance from arc of torus to chord $B$ $\rho = \sqrt{\left(\dfrac{\bar{r}}{\sin\alpha}\right)^2 + \left(\dfrac{W}{2\cos\alpha}\right)^2}$, radius of sphere $\cos \phi/2 = \sqrt{1 - (B/2\rho)^2}$, angle of sphere subtended by torus $(B/2\rho)^2 = \dfrac{1}{\left(\dfrac{2\bar{r}}{W\tan\alpha}\right)^2 + 1}$ $\bar{r} = \frac{1}{2}(r_o + r_i)$, mean radius of beam $W = r_o - r_i$, radial height of beam $\alpha = \cos^{-1}(W/B)$, mean angle of jet relative to beam radius The various symbols are identified on FIG. 5. Note that Equation (3) is the limiting case of (4) when $\alpha \rightarrow 0$ and $\rho \rightarrow \infty$. $\alpha$ is the sole indepedent variable needed to describe departure of Equation (4) from Equation (3). A plotting of the minimum jet radius of curvature as a function of mean angle of inclination shows that, for certain fixed dimensions corresponding to Thumper cavity exit beam dimensions plus 1 cm, redial clearance and $\delta = 1$ cm, $R'_{min}/R_{min} = f(\alpha)$. For certain exit beam dimensions plus 1 cm radial clearance, and $\delta = 1$ cm, the jet emerges from the nozzle for $\alpha = 0$, radially for $\alpha = 12.5°$, and with $R'_{min}/R_{min} = 0.756$ (minimum) at $\alpha = 30°$.

For Thumper, it was decided to let $\alpha = 12.5°$ to get a straight radial outflow from the window nozzle. This simplifies design and procurement by making both gas and air sides of the nozzle and gas inlets completely symmetrical. The penalty in gas and air consumption is only a 10% increase over the minimum value, and is still 20% less than that for the basic $\alpha = 0$ case.

Further elaboration on the maximizing of the jet velocity can be derived with regard to the previous equation. Thus, if jet velocity is raised, the continuity equation (1) requires that the nozzle decrease as the square of V. This can be seen by eliminating $\dot{m}$ and $\dot{m}_o$ from (1), (2) and (2a)

$$2b = \Delta p R / \rho V_o^2 \qquad (5)$$

There is an independently determined constraint on reducing 2b. In order to maintain a shear-free gas/air interface, the "potential core" of the window jet must extend clear across the beam. If 2b is too small, the turbulent mixing zone in either gas or air will intercept the gas/air interface before it crosses the beam.

A quantitative estimate of the minimum allowable 2b can be obtained from Schlichting, Boundary Layer Theory, Pergamon Press, 1955, pp 491–492, using an expression for the length/width ratio of the turbulent shear zone between two jets moving at different velocities, then taking the limiting case where one velocity is zero. Schlichting shows a plot of $$u/U_1 = f(\xi)$$

where $u$ = local mean velocity in mixing zone;
$U_1$ = velocity of jet core;
$x$ = distance in direction of jet;
$y$ = distance normal to edge of jet at origin;
$\sigma$ = empirical constant = 13.5;
$\xi = \sigma y / x$.

In the present application, the jet must span a distance $x = W$ = beam width + 1 cm on either side. The edge of the potential core is specified by the condition $$u/U_1 = 1.0$$

for which $$\xi = 1.6$$

The edge of the potential core intercepts the jet center-line when $b_{min} = y_{max} = \xi W / \sigma$ and $b_{min} = 0.118\ W$ (6) which establishes the minimum nozzle throat width for any given beam width, W. Maximum allowable jet velocity is obtained by rearranging (5).

As has been discussed, the principal advantage of the present aerowindow lies in its capability of minimizing optical beam distortion as it is transmitted through the various media of the window interfaces. Additionally, window gas consumption is minimized in the manners which have been discussed and, particularly, as a result of the geometry of the jet arrangement in which the jet is initiated from cylindrical positions within the beam annulus. Other advantages applicable to the facilitating of manufacture and operation will be recognized by those familiar with this art.

Obviously many modifications and variations of the present invention are possible in the light of the above teachings. It is therefore to be understood that within the scope of the appended claims the invention may be practiced otherwise than as specifically described.

We claim:

1. Aerodynamic light-transmissive window apparatus for transmitting a high energy laser beam from the interior of a gas laser to an outside environment comprising:

a pressurized supply source formed of a window gas having an index of refraction substantially matching that of the laser gas in said laser, a second pressurized supply source formed of a gas also having an index of refraction substantially matching that of said outside environment, nozzle means disposed for directing a window-forming gas jet across the entire cross-sectional area of said laser beam, said nozzle means including means partitioning it into at least a pair of jet-forming orifices, means communicably coupling each of said gas supply sources independently to a separate one of said jet-forming orifices whereby said window-forming gas jet is formed of contiguous first and second streams of said supply gases having a boundary interface one with the other and interfaces with said laser gas and said outside environment respectively, and means for controlling the velocities of said contiguous streams, whereby optical distortions normally produced by said shear and boundary interfaces are minimized by said equalized velocities at said boundary interface and by said matching indices of refraction at said shear interfaces, said window forming jet dynamically maintaining a fixed interior gas pressure and said control means equalizing the velocities of said streams and establishing a particular jet velocity at which said jet yieldably bends a fixed and predetermined amount responsively to said interior gas pressure whereby said interior pressure is maintained.

2. The apparatus of claim 1 wherein said control means is adjustable, said means being adjusted to provide a maximum jet velocity consistent with the maintenance of said jet boundary interface whereby said bending angle of said jet can be minimized for gas consumption purposes.

3. The apparatus of claim 1 wherein said gas laser beam is annular in shape, said nozzle being disposed centrally of said annulus and said jet orifices being formed for directing said streams radially-outwardly across the full cross-sectional area of the annulus.

4. The apparatus of claim 3 wherein said means for coupling said supply sources to said orifices includes:

a pair of ring-shaped conduits encircling the beam annulus, a plenum chamber disposed centrally of the beam annulus, said splitter plate partitioning said chamber into two parts and forming with said chamber walls said pair of jet orifices, a plurality of circumferentially-spaced spoke-like conduits coupling each of said ring-shaped conduits to a separate part of said plenum chamber, and means for coupling said separate sources one to each of said pair of ring-shaped conduits.

5. The apparatus of claim 4 wherein each of chambers includes: splash plate means for breaking-up the velocity of pressurized supply gases introduced into the chamber, and means for reducing the turbulence of the gas flow from said splash plate means.

* * * * *

UNITED STATES PATENT AND TRADEMARK OFFICE
CERTIFICATE OF CORRECTION

PATENT NO. : 4,201,952

DATED : May 6, 1980

INVENTOR(S) : Charles C. Stewart, Joel M. Avidor, Evan R. Pugh and John W. Lothrop It is certified that error appears in the above-identified patent and that said Letters Patent are hereby corrected as shown below:

Title Page

Add item - - [76] Assignee: United States of America as represented by the Secretary of the Navy, Washington, D. C.

Signed and Sealed this

Sixteenth Day of September 19

[SEAL]

Attest:

SIDNEY A. DIAMOND

Attesting Officer

Commissioner of Patents and Trademarks